(12) United States Patent
Go et al.

(10) Patent No.: US 11,644,170 B2
(45) Date of Patent: May 9, 2023

(54) LAMP FOR VEHICLE

(71) Applicant: SL Corporation, Daegu (KR)

(72) Inventors: Dong Hyun Go, Gyeongsan-si (KR); Hyo Jin Han, Gyeongsan-si (KR); Joo Jin Chang, Gyeongsan-si (KR)

(73) Assignee: SL Corporation, Daegu (KR)

( * ) Notice: Subject to any disclaimer, the term of this patent is extended or adjusted under 35 U.S.C. 154(b) by 0 days.

(21) Appl. No.: 17/565,211

(22) Filed: Dec. 29, 2021

(65) Prior Publication Data

US 2022/0205608 A1 Jun. 30, 2022

(30) Foreign Application Priority Data

Dec. 30, 2020 (KR) .......................... 10-2020-0187878

(51) Int. Cl.
*F21S 41/265* (2018.01)
*F21V 5/00* (2018.01)
(Continued)

(52) U.S. Cl.
CPC .......... *F21S 41/265* (2018.01); *F21S 41/285* (2018.01); *F21V 5/002* (2013.01); *F21V 5/004* (2013.01);
(Continued)

(58) Field of Classification Search
CPC ........ F21S 41/265; F21V 5/005; F21V 5/004; F21V 5/007; F21V 5/002; F21V 5/08;
(Continued)

(56) References Cited

U.S. PATENT DOCUMENTS

2015/0252975 A1* 9/2015 Nakada ................ F21S 41/265
362/521
2019/0072252 A1* 3/2019 Moser .................... F21S 41/68
(Continued)

FOREIGN PATENT DOCUMENTS

| CN | 114688494 A | * | 7/2022 | ............ F21S 41/265 |
| DE | 102017122956 A1 | * | 2/2019 | ................ F21S 2/00 |
| EP | 3699486 A1 | * | 8/2020 | |

OTHER PUBLICATIONS

Machine translation of DE 102017122956 A1 retrieved from the FIT database of PE2E search. (Year: 2022).*

(Continued)

*Primary Examiner* — Colin J Cattanach
(74) *Attorney, Agent, or Firm* — United One Law Group LLC; Kongsik Kim; Jhongwoo Peck

(57) ABSTRACT

Provided is a lamp for a vehicle. The vehicle lamp comprises a light source unit for generating light, and a lens unit for forming a predetermined beam pattern by allowing the light incident through a plurality of incident lenses from the light source unit to be emitted through a plurality of emitting lenses corresponding to each of the plurality of incident lenses. The plurality of incident lenses comprises a first incident lens for allowing the light incident from the light source unit to be emitted in a first direction, and a second incident lens for allowing a first portion of the light incident from the light source unit to be emitted in the first direction, and a second portion of the light to be emitted in a second direction different from the first direction.

12 Claims, 12 Drawing Sheets

(51) Int. Cl.
　　　*G02B 3/00*　　　　(2006.01)
　　　*F21V 5/08*　　　　(2006.01)
　　　*F21S 41/20*　　　(2018.01)

(52) U.S. Cl.
　　　CPC .............. *F21V 5/005* (2013.01); *F21V 5/007* (2013.01); *F21V 5/08* (2013.01); *G02B 3/005* (2013.01); *G02B 3/0043* (2013.01); *G02B 3/0056* (2013.01); *G02B 3/0062* (2013.01); *G02B 3/0068* (2013.01)

(58) Field of Classification Search
　　　CPC .... G02B 3/0043; G02B 3/005; G02B 3/0056; G02B 3/0062; G02B 5/0068
　　　See application file for complete search history.

(56) References Cited

U.S. PATENT DOCUMENTS

| | | | |
|---|---|---|---|
| 2019/0186706 A1* | 6/2019 | Kim | F21S 41/143 |
| 2020/0080704 A1* | 3/2020 | Kim | F21S 43/241 |
| 2020/0141553 A1* | 5/2020 | Han | F21S 41/275 |
| 2020/0207256 A1* | 7/2020 | Choi | H02J 7/0021 |
| 2021/0341123 A1* | 11/2021 | Mototsuji | F21S 41/322 |
| 2021/0381673 A1* | 12/2021 | Lee | F21S 41/43 |
| 2022/0196220 A1* | 6/2022 | Choi | F21S 41/43 |

OTHER PUBLICATIONS

Machine translation of CN 114688494 A retrieved from the FIT database of PE2E search. (Year: 2022).*

* cited by examiner

LAMP FOR VEHICLE

CROSS-REFERENCE TO RELATED APPLICATION

This application claims priority to Korean Patent Application No. 10-2020-0187878, filed on Dec. 30, 2020, which is incorporated herein by reference in its entirety.

BACKGROUND

1. Technical Field

The present disclosure relates to a vehicle lamp, and more particularly, to a vehicle lamp capable of being miniaturized while simultaneously irradiating light to different regions.

2. Description of the Related Art

In general, a vehicle is provided with various types of lamps having an illumination function for easily identifying an object located around the vehicle during low light conditions (e.g., night driving) and a signaling function for notifying other vehicles or road users of the driving state of the vehicle.

For example, head lamps and fog lamps are mainly for illumination functions; turn signal lamps, tail lamps and brake lamps are mainly for signaling functions, and the installation standards and specifications of each lamp are stipulated by law or regulations to ensure that the function of each lamp is fully implemented.

A beam pattern of a vehicle lamp may be formed by a single or a plurality of light irradiation regions, and when the beam pattern is formed by a plurality of light irradiation regions, a lamp for forming each of the plurality of light irradiation regions is needed to be separately provided.

Accordingly, when a lamp for forming each of the plurality of light irradiation regions is separately provided, the overall size increases and the cost increases. Therefore, a method capable of forming the plurality of light irradiation regions respectively while reducing the overall size (e.g., form factor) to enable miniaturization is being demanded.

SUMMARY

The present disclosure provides a vehicle lamp for simultaneously forming a plurality of different light irradiation regions by allowing light incident to at least one of a plurality of incident lenses to be emitted through a corresponding emitting lens in a plurality of different directions when light incident to each of a plurality of incident lenses is emitted through a corresponding emitting lens among a plurality of emitting lenses.

The problems to be solved by the present disclosure are not limited to those mentioned above, and other problems not mentioned will be clearly understood by those skilled in the art from the following description. Other specific details of the disclosure are included in the detailed description and drawings.

According to an aspect of the present disclosure, a vehicle lamp may include a light source unit for generating light; and a lens unit for forming a predetermined beam pattern by allowing the light incident through a plurality of incident lenses from the light source unit to be emitted through a plurality of emitting lenses corresponding to each of the plurality of incident lenses. The plurality of incident lenses may include a first incident lens for allowing the light incident from the light source unit to be emitted in a first direction; and a second incident lens for allowing a first portion of the light incident from the light source unit to be emitted in the first direction, and a second portion of the light to be emitted in a second direction different from the first direction.

The first incident lens may be formed so that both sides of the first incident lens are symmetrical with respect to a reference line passing in a front-rear direction through a rear focal point of a first emitting lens corresponding to the first incident lens among the plurality of emitting lenses.

The second incident lens may be formed so that both sides of the second incident lens are asymmetrical in at least one direction with respect to a reference line passing in a front-rear direction through a rear focal point of a second emitting lens corresponding to the second incident lens among the plurality of emitting lenses.

In the second incident lens, at least one of a size, a thickness, and a curvature of the both sides may be different in at least one direction with respect to the reference line.

The first incident lens and the second incident lens may form different regions within the same beam pattern. Alternatively, the first incident lens and the second incident lens may form different beam patterns.

The light incident to the first incident lens may be emitted in a direction parallel to a front-rear direction. Further, the first portion of the light incident to the second incident lens may be emitted in a direction parallel to the front-rear direction, and the second portion of the light may be refracted to be inclined downward with respect to the front-rear direction and emitted.

The second incident lens may be arranged above the first incident lens.

A ratio of the second portion of the light relative to the first portion of the light associated with each of the second incident lenses may be particularly configured based on a position of the respective second incident lens disposed within the lens unit. For example, the ratio for a second incident lens disposed above another second incident lens may be greater than the ratio for the another second incident lens.

According to another aspect of the present disclosure, a vehicle lamp may include a light source unit for generating light; and a lens unit for forming a predetermined beam pattern by allowing the light incident through a plurality of incident lenses from the light source unit to be emitted through a plurality of emitting lenses corresponding to each of the plurality of incident lenses. The lens unit may be divided into a plurality of groups to form different regions within the beam pattern, and the plurality of groups may include a first group for allowing the light to be emitted in a first direction; and a second group for allowing a first portion of the light to be emitted in the first direction, and a second portion of the light to be emitted in a second direction different from the first direction.

A direction, in which the light is emitted from the plurality of groups, may be defined based on a lens characteristic of an incident lens included in each of the plurality of groups among the plurality of incident lenses.

An incident lens included in the first group among the plurality of incident lenses may be formed so that both sides of the incident lens are symmetrical with respect to a reference line parallel to a front-rear direction.

An incident lens included in the second group among the plurality of incident lenses may be formed so that both sides of the incident lens are asymmetrical in at least one direction with respect to a reference line parallel to a front-rear direction.

According to the vehicle lamp of the present disclosure as described above, one or more of the following advantages may be provided. By eliminating a need to include separate configurations for forming different light irradiation regions, since a plurality of different light irradiation regions can be simultaneously formed by allowing the light to be emitted in a plurality of different directions when the light incident to an incident lens is emitted through a corresponding emitting lens, the overall size may be reduced, miniaturization may be possible, and cost may be reduced.

Effects of the present disclosure are not limited to the effects mentioned above, and other effects not mentioned will be clearly understood by those skilled in the art from the disclosure.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

Figure 1:
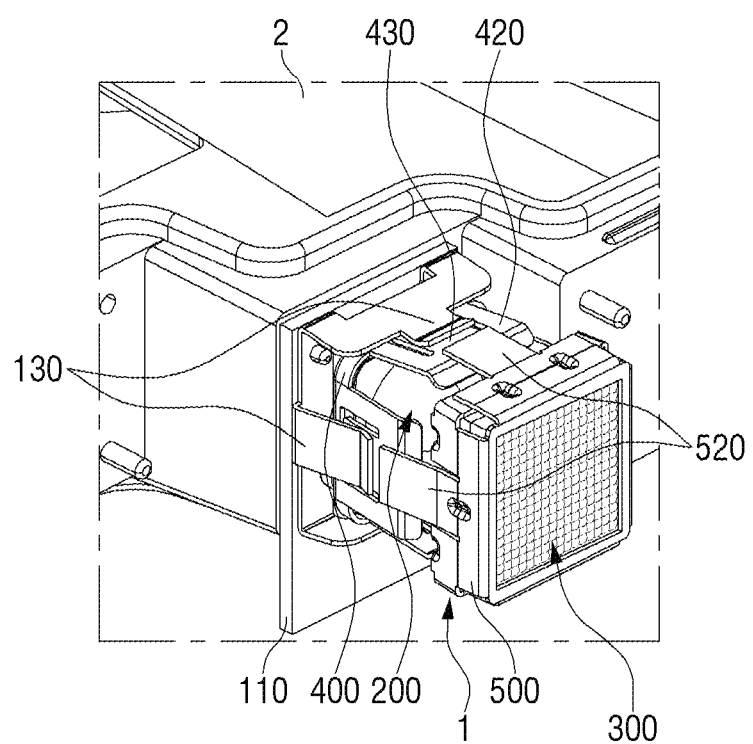
FIG. 1 is a perspective view showing a vehicle lamp according to an exemplary embodiment of the present disclosure.

Advantages and features of the present disclosure and methods of accomplishing the same may be understood more readily with reference to the following detailed description of exemplary embodiments and the accompanying drawings. The present disclosure may, however, be embodied in many different forms and should not be construed as being limited to the embodiments set forth herein. Rather, these exemplary embodiments are provided so that this disclosure will be thorough and complete and will fully convey the concept of the disclosure to those skilled in the art, and the present disclosure will only be defined by the appended claims. Throughout the specification, like reference numerals in the drawings denote like elements.

In some exemplary embodiments, well-known steps, structures and techniques will not be described in detail to avoid obscuring the disclosure.

The terminology used herein is for the purpose of describing particular exemplary embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Exemplary embodiments of the disclosure are described herein with reference to plan and cross-sectional illustrations that are schematic illustrations of idealized exemplary embodiments of the disclosure. As such, variations from the shapes of the illustrations as a result, for example, of manufacturing techniques and/or tolerances, are to be expected. Thus, exemplary embodiments of the disclosure should not be construed as limited to the particular shapes of regions illustrated herein but are to include deviations in shapes that result, for example, from manufacturing. In the drawings, respective components may be enlarged or reduced in size for convenience of explanation.

Hereinafter, the present disclosure will be described with reference to the drawings for describing a vehicle lamp according to exemplary embodiments of the present disclosure.

Figure 2:
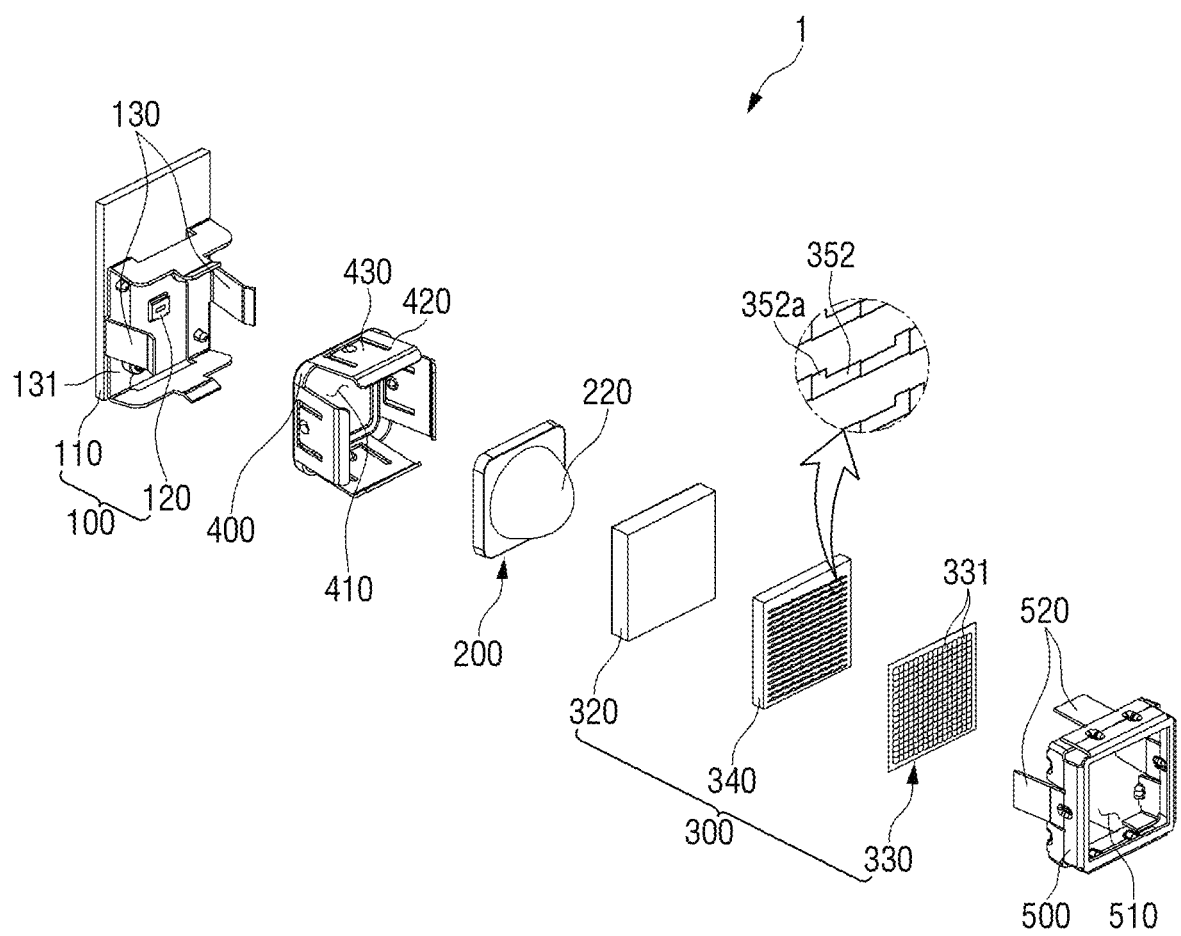
FIGS. 2 and 3 are exploded perspective views showing a vehicle lamp according to an exemplary embodiment of the present disclosure.
Figure 3:
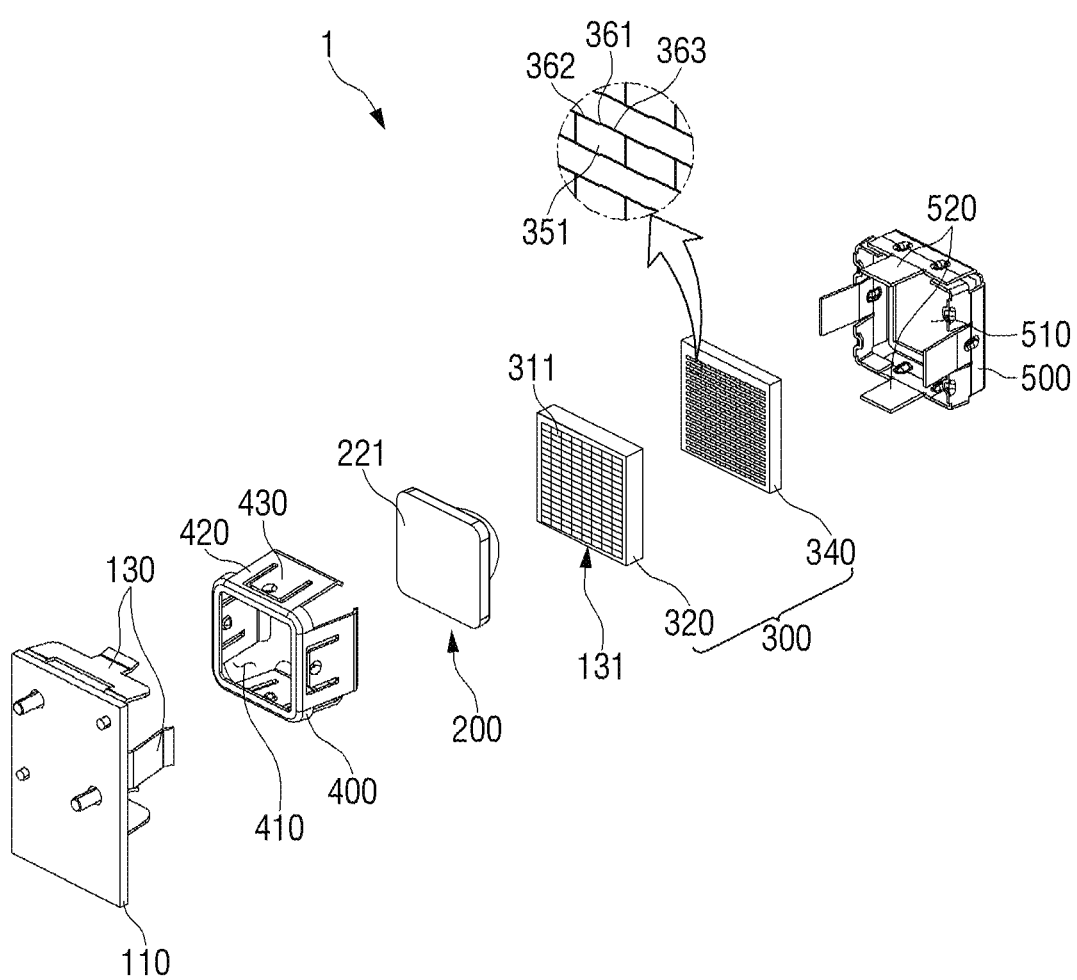
Figure 4:
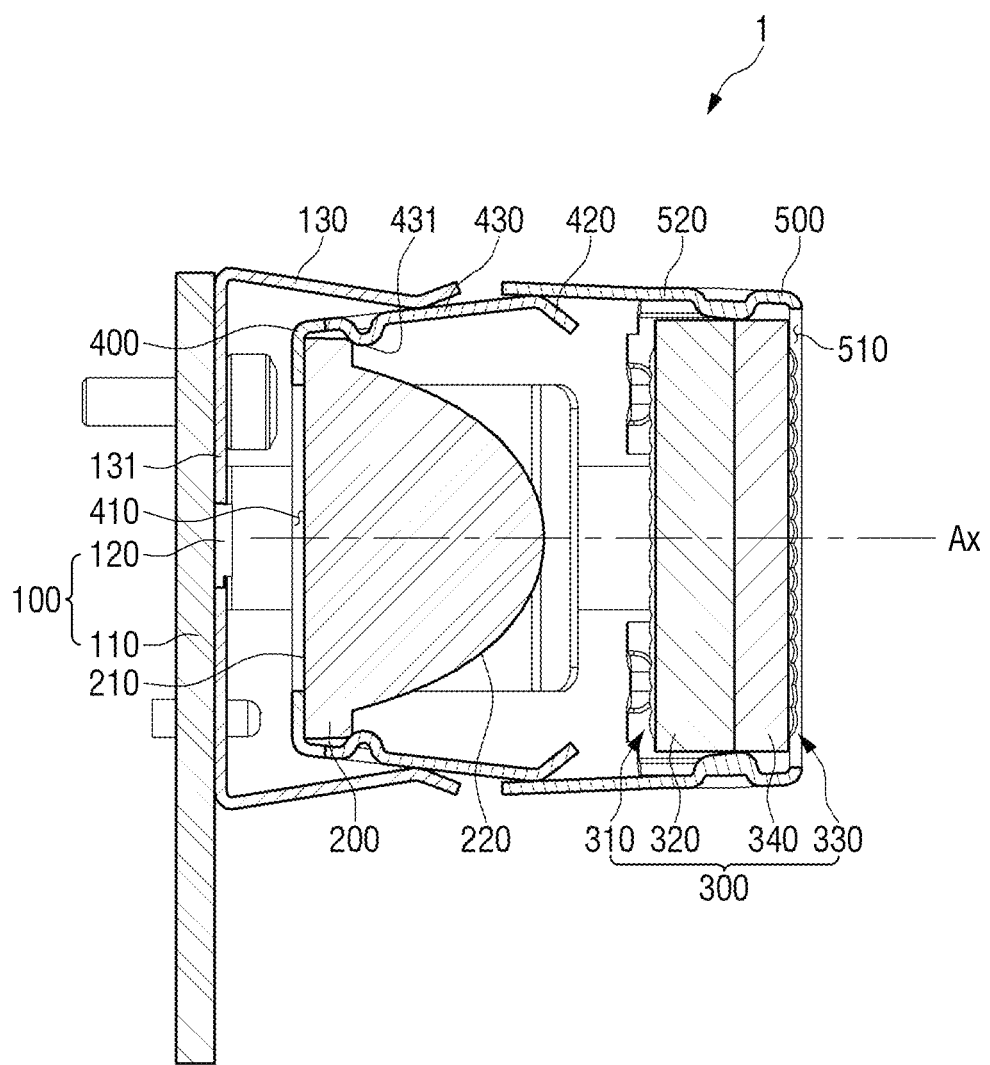
FIG. 4 is a cross-sectional view showing a vehicle lamp according to an exemplary embodiment of the present disclosure.

FIG. 1 is a perspective view showing a vehicle lamp according to an exemplary embodiment of the present disclosure, FIGS. 2 and 3 are exploded perspective views showing a vehicle lamp according to an exemplary embodiment of the present disclosure, and FIG. 4 is a cross-sectional view showing a vehicle lamp according to an exemplary embodiment of the present disclosure.

Referring to FIGS. 1 to 4, the vehicle lamp 1 according to the exemplary embodiment of the present disclosure may include a light source unit 100, a light path adjusting unit 200, and a lens unit 300.

In the exemplary embodiment of the present disclosure, for example, the vehicle lamp 1 may be used as a head lamp installed on both sides of the front side of the vehicle so that the driver's front view is secured by irradiating light in the driving direction of the vehicle when the vehicle is driving in low light conditions (e.g., at night or in a dark place such as a tunnel). However, the present disclosure is not limited thereto, and the vehicle lamp 1 of the present disclosure may be used not only as a head lamp, but also as various lamps installed in a vehicle, such as a tail lamp, a brake lamp, a fog lamp, a position lamp, a turn signal lamp, a daytime running lamp (DRL), and a backup lamp.

When the vehicle lamp 1 of the present disclosure is used as a head lamp, an example where the vehicle lamp 1 of the present disclosure forms a low beam pattern, in which light is irradiated on the lower side with respect to a predetermined cut-off line so as not to cause glare to the driver of a vehicle in front such as a preceding vehicle or an oncoming vehicle, will be described. However, the present disclosure is not limited thereto, and the formed beam pattern may vary depending on the purpose of the vehicle lamp 1 of the present disclosure.

In addition, in the exemplary embodiment of the present disclosure, a case in which a single vehicle lamp 1 is used is described as an example, but the present disclosure is not limited thereto, and two or more of the vehicle lamps 1 of the present disclosure may be used to meet light distribution characteristics such as the shape, size, brightness of the beam pattern to be formed by the vehicle lamp 1 of the present disclosure.

The light source unit 100 may include a substrate 110 and a light source 120 installed on the substrate 110. Various components for controlling the light source 120 or supplying power to the light source 120 may be installed on the substrate 110 along with the light source 120, and the substrate 110 may be installed on a heat dissipating means 2 (see FIG. 1) such as a heat sink so as to facilitate heat dissipation in order to prevent deterioration of light emitting performance due to the heat generated from the light source 120.

The light source 120 may include at least one light emitting device. In the exemplary embodiment of the present disclosure, a case in which a semiconductor light emitting device such as a light emitting diode (LED) is used as the light emitting device will be described as an example. However, the present disclosure is not limited thereto, and various types of light sources such as a laser diode (LD) or a bulb having a light quantity and/or color suitable for the purpose of the vehicle lamp 1 of the present disclosure may be used as the light source 120.

The light source unit 100 may include a plurality of fixing units 130 formed such that one end extends forward from the other end close to the substrate 110, and the plurality of fixing units 130 may be disposed to face each other at both ends of the substrate 110 so that when assembling the light path adjusting unit 200 to be described later below, it can apply a force to both sides of the light path adjusting unit 200, thereby fixing the position of the light path adjusting unit 200.

In the exemplary embodiment of the present disclosure, the plurality of fixing units 103, in which one end connected to one side of the fixing bracket 131 coupled to the substrate 110 is formed by bending forward, are described as an example, but the present disclosure is limited thereto, and one end of the plurality of fixing units 130 may be directly coupled to the substrate 110.

Each of the plurality of fixing units 130 may be formed such that a point between both ends is disposed closer to the optical axis Ax of the light source 120 than one end, and when assembling the light path adjusting unit 200 to be described later below, the other end of the plurality of fixing units 130 may receive a force in a direction away from the optical axis Ax of the light source 120, and accordingly, the position of the light path adjusting unit 200 can be fixed by the restoring force generated from the plurality of fixing units 130. As such, the plurality of fixing units 130 may include an elastic material. By way of example, the plurality of fixing units 130 may be made of a metal. In this case, the optical axis Ax of the light source 120 may be understood as a line that passes longitudinally (e.g., in the front-rear direction) through the center of a region where light is generated from at least one light emitting device included in the light source 120.

The position of the light path adjusting unit 200 may be fixed by a support bracket 400, in which a light transmitting opening 410 is formed so that the light generated from the light source 120 may be incident on the light path adjusting unit 200. The support bracket 400 may include a plurality of support units 420, each formed to extend forwardly from an edge of the light transmitting opening 410, and each of the plurality of support units 420 may include a support rib 430 for fixing the light path adjusting unit 200 therein by receiving a force in a direction toward the optical axis Ax of the light source 120 by each of the plurality of fixing units 130.

The support rib 430 may include one end connected to the support unit 420, and the other portion may protrude from the support unit 420, and the position of the light path adjusting unit 200 may be fixed by the support rib 430 being elastically deformed with respect to one end of the support rib 430 connected to the support unit 420 when receiving a force by the plurality of fixing units 130.

The support rib 430 may include a protrusion portion 431 that protrudes toward the light path adjusting unit 200 on the surface facing the light path adjusting unit 200, and the protrusion portion 431 may be disposed in front of the outer edge of the light path adjusting unit 200 so that the rear surface thereof may be in contact with the edge of the light transmitting opening 410, thereby fixing the position of the light path adjusting unit 200 together with the edge of the light transmitting opening 410.

The light path adjusting unit 200 may adjust the path of the light so that the light generated from the light source 120 may proceed substantially parallel to the optical axis Ax of the light source 120 to allow the light to be uniformly incident on the lens unit 300 to be described later below.

In the exemplary embodiment of the present disclosure, an aspherical lens may be used as the light path adjusting unit 200, in which the incident surface 210 on which the light is incident has a planar shape, and the emitting surface 220 through which the light is emitted has an aspherical shape. However, the present disclosure is not limited thereto, and the light path adjusting unit 200 may be implemented as not only an aspherical lens, but also various types of lenses, such as a Fresnel lens or a total internal reflector (TIR) lens, for adjusting the path of the light so that the light generated from the light source 120 having a predetermined light irradiation angle with respect to the optical axis Ax may proceed substantially parallel to the optical axis Ax.

The lens unit 300 may emit the light incident from the light path adjusting unit 200 to form a beam pattern suitable for the purpose of the vehicle lamp 1 of the present disclosure. The position of the lens unit 300 may be fixed by a lens holder 500, in which an opened portion 510 is formed so that the light incident from the light path adjusting unit 200 may be emitted therethrough. The lens holder 500 may include a plurality of fixing ribs 520 that extend rearwardly from the edge of the opened portion 510, and the lens holder 500 may be coupled to the support bracket 400 to fix the position of the lens unit 300.

The lens unit 300 may be fitted between the fixing ribs formed to face one another among the plurality of fixing ribs 520 and be fixed in position, and each of the plurality of fixing ribs 520 may apply a force to each of the plurality of support units 420 in a direction toward the optical axis Ax of the light source 120, and accordingly, a restoring force may be generated from each of the plurality of support units 420 so that the support bracket 400 and the lens holder 500 may be fixed in position with each other.

To this end, the plurality of support units 420 may be formed so that one end close to the lens unit 300 is spaced farther from the optical axis Ax of the light source 120 compared to the other end connected to the edge of the light transmitting opening 410. Due to this configuration, when the one end of the plurality of support units 420 receives a force toward the optical axis Ax of the light source 120 by the plurality of fixing ribs 520, the position of the lens unit 300 can be fixed by the restoring force generated from the plurality of support units 420.

Figure 5:
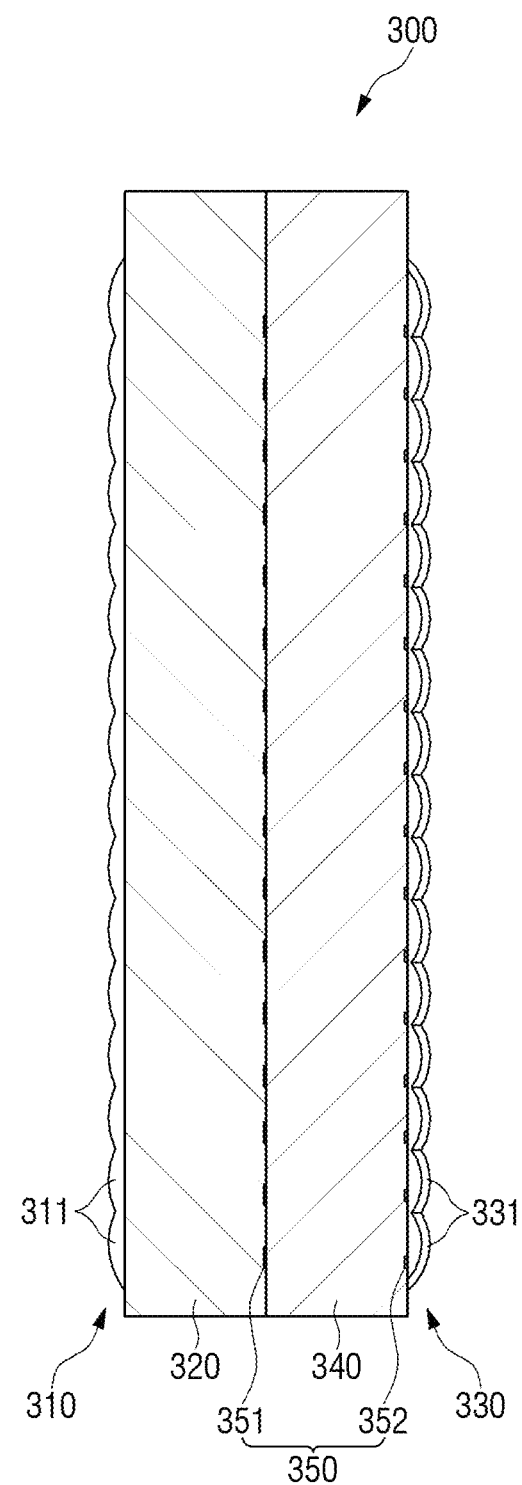
FIG. 5 is a cross-sectional view showing a lens unit according to an exemplary embodiment of the present disclosure.

FIG. 5 is a cross-sectional view illustrating a lens unit according to an exemplary embodiment of the present disclosure. Referring to FIG. 5, the lens unit 300 according to the exemplary embodiment of the present disclosure may include an incident lens unit 310, a first optical unit 320, an emitting lens unit 330, a second optical unit 340, and a shield unit 350.

The incident lens unit 310 may include a plurality of incident lenses 311 that form rows that extend in the left-right direction, and are arranged in a matrix form such that the rows in the left-right direction are arranged in the vertical direction. The plurality of incident lenses 311 may be formed to have a convex shape toward the light path adjusting unit 200.

In the exemplary embodiment of the present disclosure, a case in which a micro lens having a relatively short focal length is used as the plurality of incident lenses 311 to reduce the overall size of the vehicle lamp 1 of the present disclosure will be described as an example.

The incident lens unit 310 may be formed on an incident surface, on which light is incident from the light path adjusting unit 200, of the first optical unit 320. The first optical unit 320 may be made of a material, through which light is transmittable, such as glass. In the exemplary embodiment of the present disclosure, a case in which the incident lens unit 310 is integrally formed with the first optical unit 320 by surface processing thereof will be described as an example, but the present disclosure is not limited thereto, and the incident lens unit 310 may be formed separately from the first optical unit 320 and be subsequently attached to the first optical unit 320.

Figure 6:
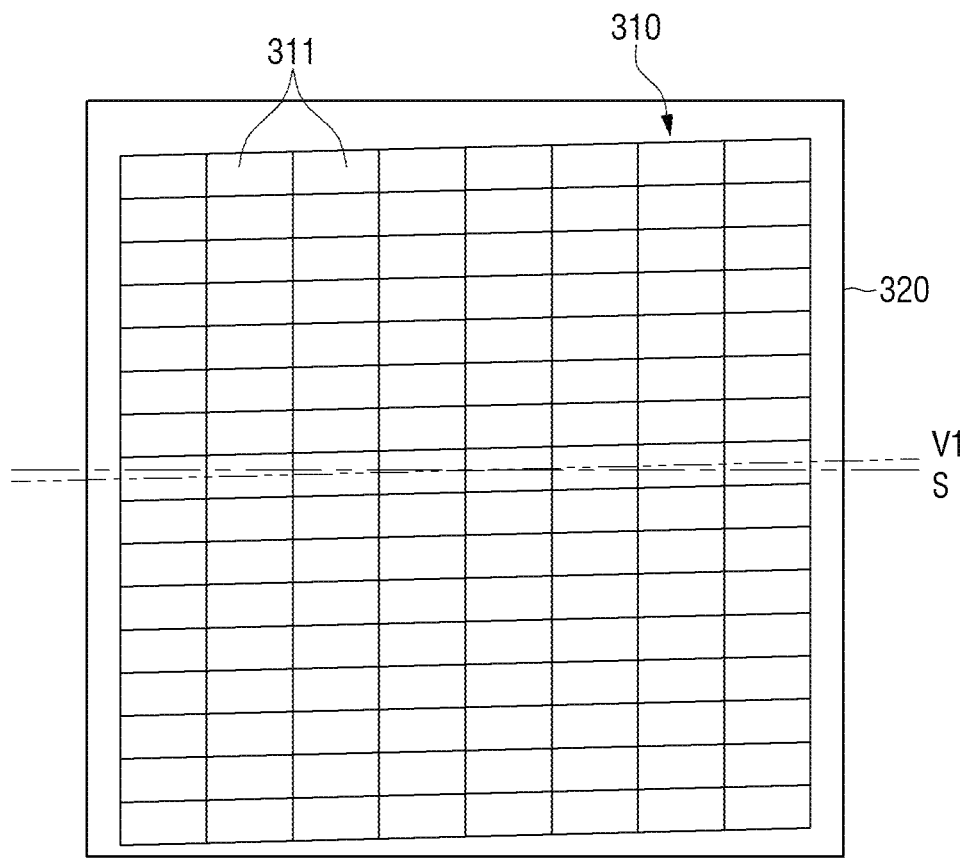
FIG. 6 is a rear view showing a lens unit according to an exemplary embodiment of the present disclosure.

The plurality of incident lenses 311 may be arranged so that rows in the left-right direction are inclined at a predetermined angle with respect to the horizontal direction, and as shown in FIG. 6, it may be understood that an imaginary line V1 connecting a specific point (e.g., a center) of each incident lens arranged to form a row in the left-right direction is arranged to be inclined with a predetermined angle with respect to the horizontal line S.

The emitting lens unit 330 may include a plurality of emitting lenses 331 that form rows that extend in the left-right direction, and are arranged in a matrix form such that the rows in the left-right direction are arranged in the vertical direction, and the plurality of emitting lenses 331 may be formed to have a convex shape toward the front.

In the exemplary embodiment of the present disclosure, a case in which micro lenses having a relatively short focal length are used as the plurality of emitting lenses 331 so as to reduce the overall size of the vehicle lamp 1 of the present disclosure, like the plurality of incident lenses 311, will be described as an example.

The emitting lens unit 330 may be formed on an emitting surface, through which light is emitted forward, of the second optical unit 340. The second optical unit 340 may be made of a material, through which light is transmittable, such as glass. In the exemplary embodiment of the present disclosure, a case in which the emitting lens unit 330 is integrally formed with the second optical unit 340 by surface processing thereof will be described as an example. However, the present disclosure is not limited thereto, and the emitting lens unit 330 may be formed separately from the second optical unit 340 and be subsequently attached to the second optical unit 340.

Figure 7:
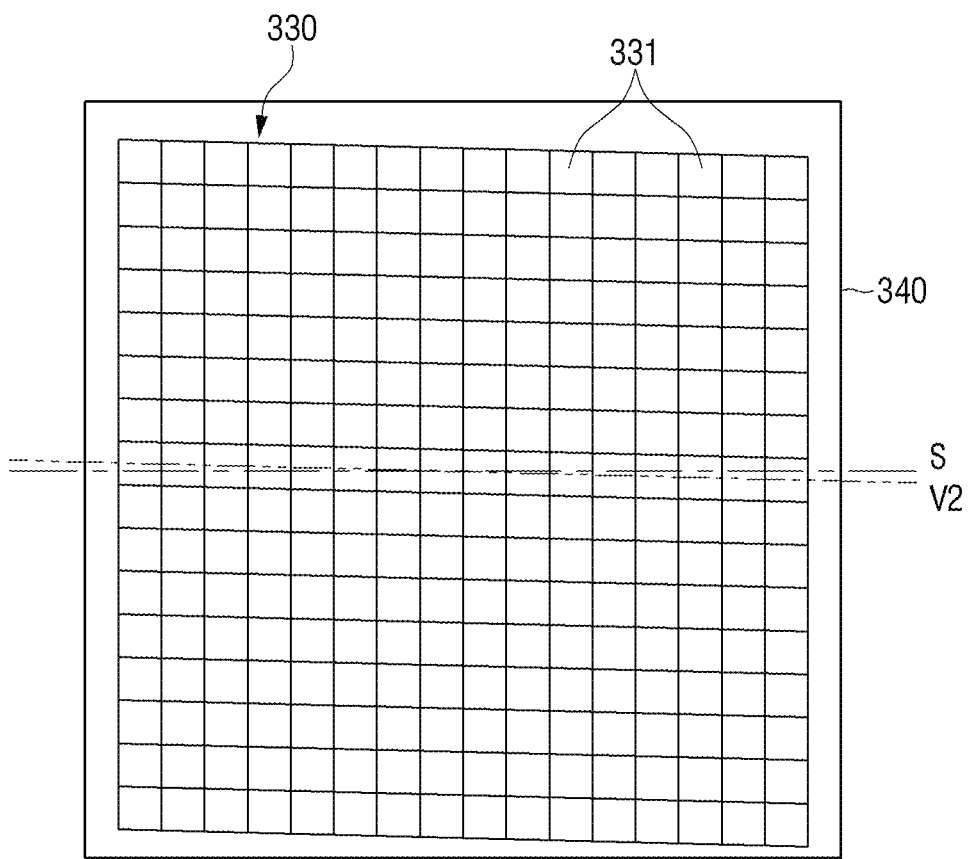
FIG. 7 is a front view showing a lens unit according to an exemplary embodiment of the present disclosure.

Also, similar to the plurality of incident lenses 311, the plurality of emitting lenses 331 may be arranged so that the rows in the left-right direction are inclined at a predetermined angle with respect to the horizontal direction. As shown in FIG. 7, it may be understood that an imaginary line V2 connecting a specific point (e.g., a center) of each of the emitting lenses that are arranged to form the row in the left-right direction is arranged to be inclined with a predetermined angle with respect to the horizontal line S.

In the exemplary embodiment of the present disclosure, a case in which each of the plurality of incident lenses 311 is a lens of a semi-cylindrical shape that extends in the left-right direction, and the light emitted from each of the plurality of incident lenses 311 is incident on a plurality of emitting lenses arranged in the extension direction of the plurality of incident lenses 311, will be described as an example. For example, the light emitted from each of the plurality of incident lenses 311 may be incident on two or more emitting lenses arranged in the left-right directions among the plurality of emitting lenses 331.

The number of emitting lenses, on which the light emitted from each of the plurality of incidence lenses 311 is incident, is not limited to the above-described example. Depending on the shape of the plurality of incidence lenses 311 and the plurality of emitting lenses 331, it may correspond to one-to-one, one-to-many, many-to-one, many-to-many, etc. Examples of the plurality of incident lenses 311 and the plurality of emitting lenses 331 corresponding one-to-many, many-to-one, or many-to-many can be found in U.S. Patent Application Publication No. 2019/0186706, which is incorporated herein by reference in its entirety.

The configuration in which the light emitted from each of the plurality of incident lenses 311 is incident on two or more of the plurality of emitting lenses 331 may improve the spread characteristics of the beam pattern formed by the vehicle lamp 1 of the present disclosure.

FIG. 6 shows the plurality of incident lenses 311 arranged so that the rows in the left-right directions are inclined at a predetermined angle when the incident lens unit 310 is viewed from the rear of the lens unit 300. FIG. 7 shows that plurality of emitting lenses 331 arranged so that the rows in the left-right direction are inclined at a predetermined angle when the emitting lens unit 330 is viewed from the front of the lens unit 330. It may be understood that the plurality of incident lenses 311 and the plurality of emitting lenses 331 are arranged such that the rows in the left-right direction are formed to be inclined in the same direction with respect to the horizontal line S.

Meanwhile, the second optical unit 340 may be disposed in front of the first optical unit 320, and may be disposed so that surfaces facing each other are in contact with each other, but the present disclosure is not limited thereto, and the first optical unit 320 and the second optical units 340 may be spaced apart from each other at a predetermined interval to promote, e.g., light diffusion and the like.

The shield unit 350 may be disposed between the incident lens unit 310 and the emitting lens unit 330 to obstruct at least a portion of the light emitted to each of the plurality of emitting lenses 331, so that a beam pattern having a suitable shape and/or size for the purpose of the vehicle lamp 1 of the present disclosure may be formed. In the exemplary embodiment of the present disclosure, since an example where the low beam pattern is formed by the vehicle lamp 1 is described, it may be understood that a cut-off line of the low beam pattern may be formed by the shield unit 350.

The shield unit 350 may include a plurality of first shields 351 and a plurality of second shields 352 respectively formed on an incident surface and an emitting surface of any one of the first optical unit 320 or the second optical unit 340. In an exemplary embodiment of the present disclosure, a case in which the plurality of first shields 351 are formed on the incident surface of the second optical unit 340, that is, the surface facing the first optical unit 320, and the plurality of the second shields 352 are formed on the emitting surface of the second optical unit 340, that is, the front-facing surface, will be described as an example.

Each of the plurality of first shields 351 may be disposed such that an upper center region thereof is disposed at the focal point of a corresponding pair of the incident lens and the emitting lens, among the plurality of incident lenses 311 and the plurality of emitting lenses 331, and accordingly, it may block a portion of the light incident to each of the plurality of emitting lenses 331 to form a cut-off line of the low beam pattern.

An upper end (e.g., top line) of each of the plurality of first shields 351 may include an inclined edge portion 361, a first edge portion 362 that extends horizontally from the lower end of the inclined edge portion 361, and a second edge portion 363 that extends horizontally from an upper end of the inclined edge portion 361.

In this configuration, since the cut-off line of the low beam pattern to be formed by the vehicle lamp 1 of the present disclosure has a step difference between the left and right sides with respect to the center, the top line of each of the plurality of first shields 351 may be formed with a step difference between both sides (i.e., the first edge portion 362 and the second edge portion 363). However, the shape of the top line of the plurality of first shields 351 is not limited to the above-described example, and it may be formed as a horizontal line, or may have a step difference in other portions, depending on the shape of the cut-off line of the low beam pattern to be formed by the vehicle lamp 1 of the present disclosure.

Figure 8:
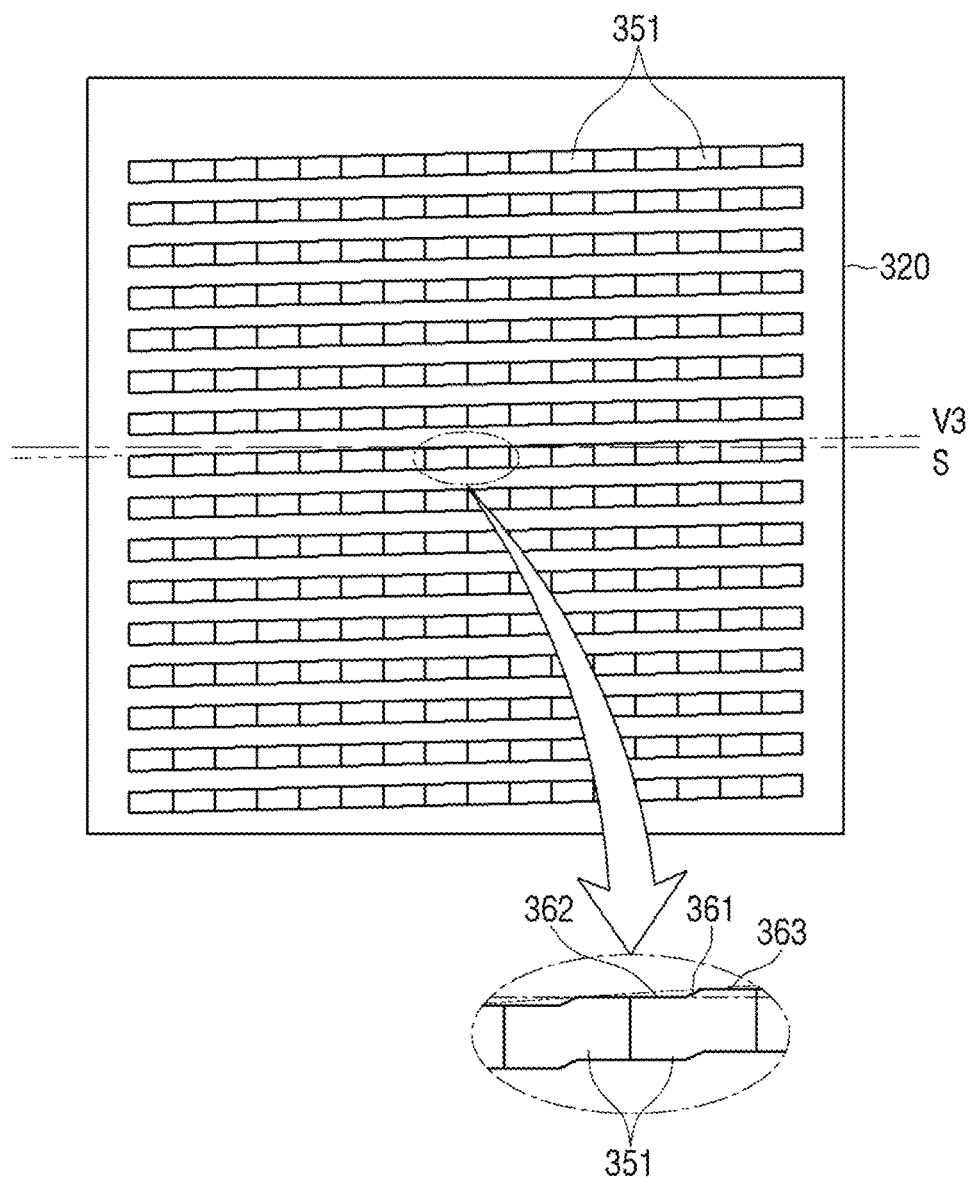
FIG. 8 is a schematic diagram illustrating a first shield according to an exemplary embodiment of the present disclosure.

The plurality of first shields 351 may be arranged such that the rows that extend in the left-right direction are arranged in the vertical direction, and as shown in FIG. 8, the rows in the left-right direction may be arranged to be inclined at a predetermined angle with respect to the horizontal line.

FIG. 8 shows an example in which the plurality of first shields 351 are viewed from the rear of the second optical unit 340, and the plurality of first shields 351 are arranged so that the rows in the left-right direction are inclined at a predetermined angle, which may be understood that an imaginary line V3 connecting a specific point (e.g., the upper end of the inclined edge portion 361) of each of the plurality of first shields 351 is arranged to have a predetermined angle with the horizontal line S.

Due to the configuration that the plurality of first shields 351 are arranged so that the rows in the left-right direction are inclined at a predetermined angle, the first edge portion 362 of any one of the plurality of first shields 351 may have the same height (i.e., vertical position) as the second edge portion 363 of an adjacent shield (e.g., the left shield shown in the inset of FIG. 8), and the second edge portion 363 thereof may have the same height (i.e., vertical position) as the first edge portion 362 of the other adjacent shield (e.g., the right shield).

In other words, when the plurality of first shields 351 are arranged horizontally in the left-right direction, a step difference may occur between the first and second edge portions of any two adjacent ones of the plurality of first shields 351, and this step difference may cause a portion that protrudes upward or recessed downward from both ends of the cut-off line to be formed. In such cases, not only the driver may feel a sense of discomfort, but also the driver's field of view may become restricted or glare may occur to the driver of the vehicle in front.

Accordingly, in the exemplary embodiment of the present disclosure, the plurality of first shields 351 may be arranged so that the rows in the left-right direction are inclined at a predetermined angle, thereby preventing a step difference between the first shields adjacent to one another.

When the plurality of first shields 351 are arranged so that the rows in the left-right direction are inclined at a predetermined angle, the position of the focal point is changed compared to the case where the plurality of first shields 351 are horizontally arranged, and accordingly, the plurality of incident lenses 311 and the plurality of emitting lenses 331 may also be arranged so that the rows in the left-right direction are inclined at a predetermined angle as described above.

In the exemplary embodiment of the present disclosure, a case in which the plurality of first shields 351 are arranged so that the rows in the left-right direction are inclined upward in the direction from the first edge portion 362 to the second edge portion 363 is described as an example. Since the first edge portion 362 forms a line corresponding to the driving lane of the cut-off line, and the second edge portion 363 forms a line corresponding to the opposite lane of the cut-off line, it may be understood that the plurality of first shields 351 are arranged so that the rows in the left-right direction are inclined upward in a direction from the opposite lane toward the driving lane.

In addition, the plurality of second shields 352 may be provided for horizontally forming a cut-off line. Since the cut-off line is mainly formed by light emitted from the lower portion of the plurality of emitting lenses 331, the cut-off line can be formed horizontally compared to the case, in which the plurality of second shields 352 are omitted.

Figure 9:
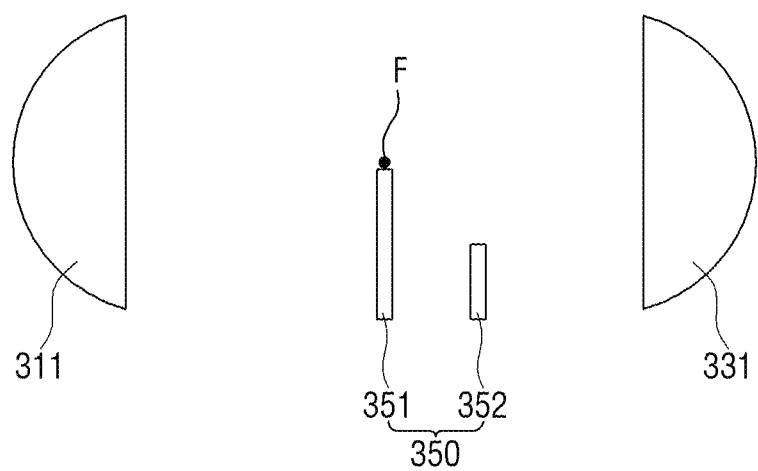
FIG. 9 is a schematic diagram illustrating a first shield and a second shield according to an exemplary embodiment of the present disclosure.

In an exemplary embodiment of the present disclosure, the upper end of each of the plurality of second shields 352 may be disposed lower than the upper end of the corresponding first shield among the plurality of first shields 351 as shown in FIG. 9. This configuration may increase the light efficiency because if each of the plurality of second shields 352 has the upper end disposed at the same vertical position or higher than the upper end of the plurality of first shields 351, in which the upper center is disposed at or near the rear focal point F of each of the plurality of emitting lenses 331, the amount of light that is blocked may be relatively increased and the light efficiency may be decreased.

In addition, the plurality of second shields 352 may be arranged so that the rows in the left-right direction are inclined, like the plurality of incident lenses 311, the plurality of emitting lenses 331, and the plurality of first shields 351 described above.

A protrusion portion 352a (see the inset of FIG. 2) that protrudes upward may be formed on a portion of the upper end of each of the plurality of second shields 352, and the protrusion portion 352a may prevent the vehicle lamp 1 according to the present disclosure from causing glare to the driver of the vehicle in front.

The light irradiated from the vehicle lamp 1 of the present disclosure described above may be irradiated in one, two, or more directions depending on the lens characteristics of each of the plurality of incident lenses 311, and in the exemplary embodiment of the present disclosure, a case in which light incident to at least one of a plurality of incident lenses 311 is emitted in a plurality of different directions when being emitted to a corresponding emitting lens among the plurality of emitting lenses 331 will be described as an example. This configuration may enable the formation of a beam pattern suitable for the purpose of the vehicle lamp 1 of the present disclosure while enabling miniaturization by allowing two or more light irradiation regions to be formed simultaneously through the vehicle lamp 1 of the present disclosure so as to eliminate a need to provide a lamp for forming each light irradiation region separately. Accordingly, the number of lamps required may be reduced.

Figure 10:
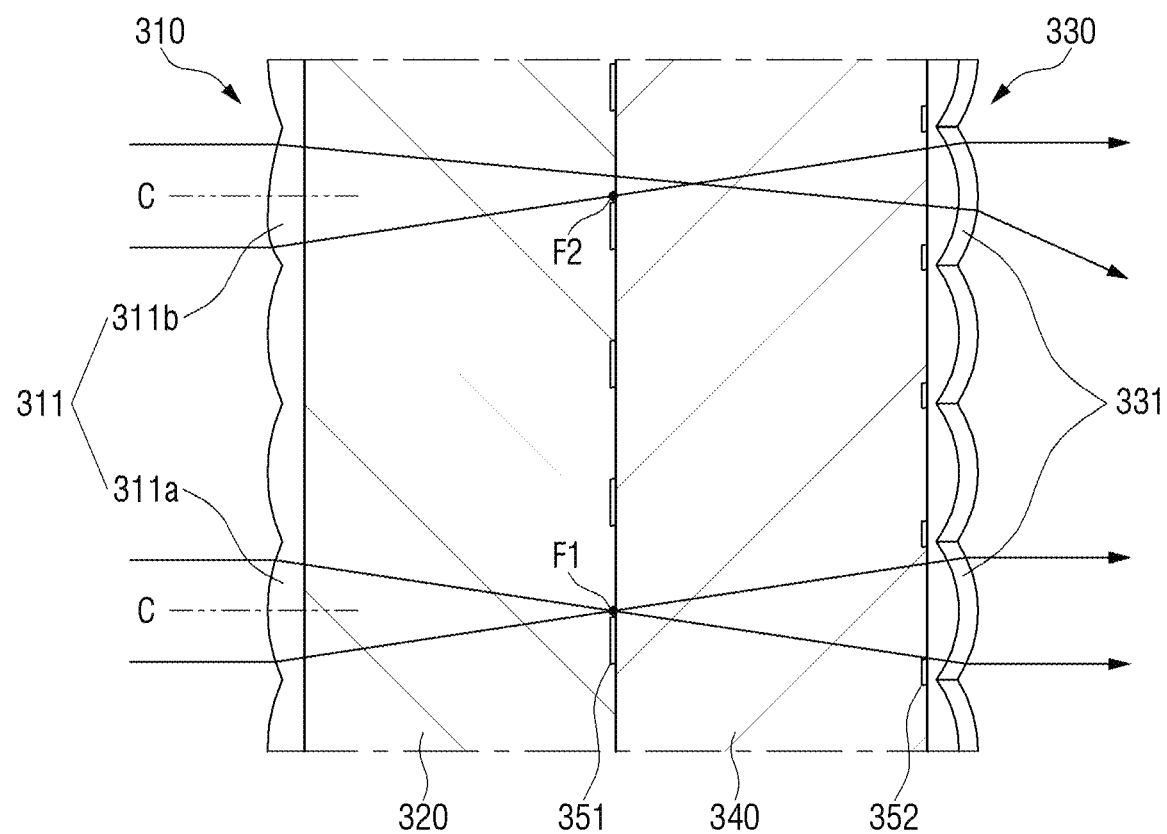
FIG. 10 is a schematic diagram illustrating a path of light incident to a first incident lens and a second incident lens according to an exemplary embodiment of the present disclosure.

FIG. 10 is a schematic diagram illustrating a light path by a lens unit according to an exemplary embodiment of the present disclosure. Referring to FIG. 10, in the lens unit 300 according to the exemplary embodiment of the present disclosure, the first incident lens 311a among the plurality of incident lenses 311 may be formed so that both sides (e.g., the top side and the bottom side) are symmetrical in the vertical direction with respect to the reference line C, and the second incident lens 311b may be formed so that both sides are asymmetrical in the vertical direction with respect to the reference line C. As used herein, "the first incident lens 311a" may refer to an incident lens formed so that both sides are symmetrical in the vertical direction with respect to the reference line C, and "the second incident lens 311b" may refer to an incident lens formed so that both sides are asymmetrical in the vertical direction with respect to the reference line C. The reference line C may be understood as a line passing in the front-rear direction through the rear focal points F1 and F2 of the first emitting lens 331a and the second emitting lens 331b corresponding to each of the first incident lens 311a and the second incident lens 311b, respectively, among the plurality of emitting lenses 331.

The light incident to the first incident lens 311a may be emitted in a first direction through the first emitting lens 331a. A portion of the light incident to the second incident lens 311b may be emitted in a first direction through the second emitting lens 331b, and another portion of the light incident to the second incident lens 311b may be emitted in a second direction different from the first direction through the second emitting lens 331b.

In the exemplary embodiment of the present disclosure, for example, the light incident to the first incident lens 311a may be emitted in a direction substantially parallel to the reference line C, i.e., a first direction, and the portion of the light incident to the second incident lens 311b may be emitted in a direction parallel to the reference line C, while the another portion may be refracted downward and be emitted.

In other words, the light incident to the first incident lens 311a approximately parallel to the reference line C may pass through the focal point F1 between the first incident lens 311a and the first emitting lens 331a and may be emitted approximately parallel to the reference line C through the first emitting lens 331a.

Meanwhile, the light incident to the second incident lens 311b may be emitted through the second emitting lens 331b similar to the first incident lens 311a. In the second incident lens 311b, however, unlike the first incident lens 311a, a portion of the incident lights may be emitted approximately parallel to the reference line C, while another portion of the light may pass through a point spaced apart in the vertical direction from a focal point F2 between the second incident lens 311b and the second emitting lens 331b by a predetermined interval and may be incident to the second emitting lens 331b, so that it can be refracted downward with respect to the reference line C and be emitted.

In the exemplary embodiment of the present disclosure, a case in which light incident above the reference line C is emitted to be inclined downward with respect to the reference line C is described as an example, but this is merely an example to help the understanding of the present disclosure. The present disclosure is not limited thereto, and the shapes of the second incident lens 311b, such as sizes, thicknesses, and curvatures of upper and lower sides, with respect to the reference line C may vary, and accordingly, the direction of the light emitted through the second emitting lens 331b may also vary.

For example, since the first incident lens 311a is formed to be symmetrical in the vertical direction with respect to the reference line C, the light emitted from the first emitting lens 331a may be emitted parallel to the reference line C. Since the second the incident lens 311b is formed to be asymmetrical in the vertical direction with respect to the reference line C, the light refracted to be inclined at a predetermined angle with respect to the reference line C as well as parallel light with respect to the reference line C may be emitted together from the second emitting lens 331b.

In an exemplary embodiment of the present disclosure, the light is simultaneously emitted in a plurality of different directions from the second emitting lens 331b so that a high illuminance region and a spread region of the low beam pattern may be formed by the vehicle lamp 1 of the present disclosure.

For example, when the low beam pattern is formed by the vehicle lamp 1 of the present disclosure, there is a need for forming a high illuminance region for securing a sufficient viewing distance in front of the vehicle and a spread region for securing a wider viewing range in front of the vehicle. In case where the lamps for forming the high illuminance region and the spread region of the low beam pattern are provided separately, the configuration may become more complicated and the overall size may increase, whereas in the exemplary embodiment of the present disclosure, since the light for forming the high illuminance region and the light for forming the spread region are emitted together from one lamp, the number of lamps required to form a beam pattern suitable for the purpose of the vehicle lamp 1 of the present disclosure may be relatively reduced, allowing the overall size to be reduced and leading to advantages in miniaturization and cost reduction.

When different light irradiation regions are formed using different emitting lenses 331 having different lens characteristics, chromatic aberration may occur due to the use of the plurality of emitting lenses 331, making it relatively more difficult to control the light. Therefore, in the exemplary embodiment of the present disclosure, different light irradiation regions may be formed from each of the plurality of incident lenses 311 by differentiating the lens characteristics within the each incident lens 311.

Further, in the above-described exemplary embodiment, the second incident lens 311b may be disposed above the first incident lens 311a to prevent interference by a structure such as a vehicle body or a bezel, which may be disposed on the path of the light refracted downward and emitted through the second emitting lens 331b.

In addition, for the second incident lens 311b, at least one of the size, thickness, and curvature of both sides (e.g., top and bottom sides) may be adjusted in at least one direction with respect to the reference line C to adjust the ratio of light emitted in each of a plurality of different directions. For example, the incident lens arranged at a position closer to the lower end of the lens unit 300 among the second incident lenses 311b may be configured to increase the ratio of the amount of light emitted parallel to the reference line C, so that interference by the structure may be reduced or avoided. On the other hand, the incident lens arranged at a position closer to the upper end of the lens unit 300 may be configured to increase the ratio of the amount of light emitted to be inclined downward with respect to the reference line C, so that the spread characteristics can be improved.

Figure 11:
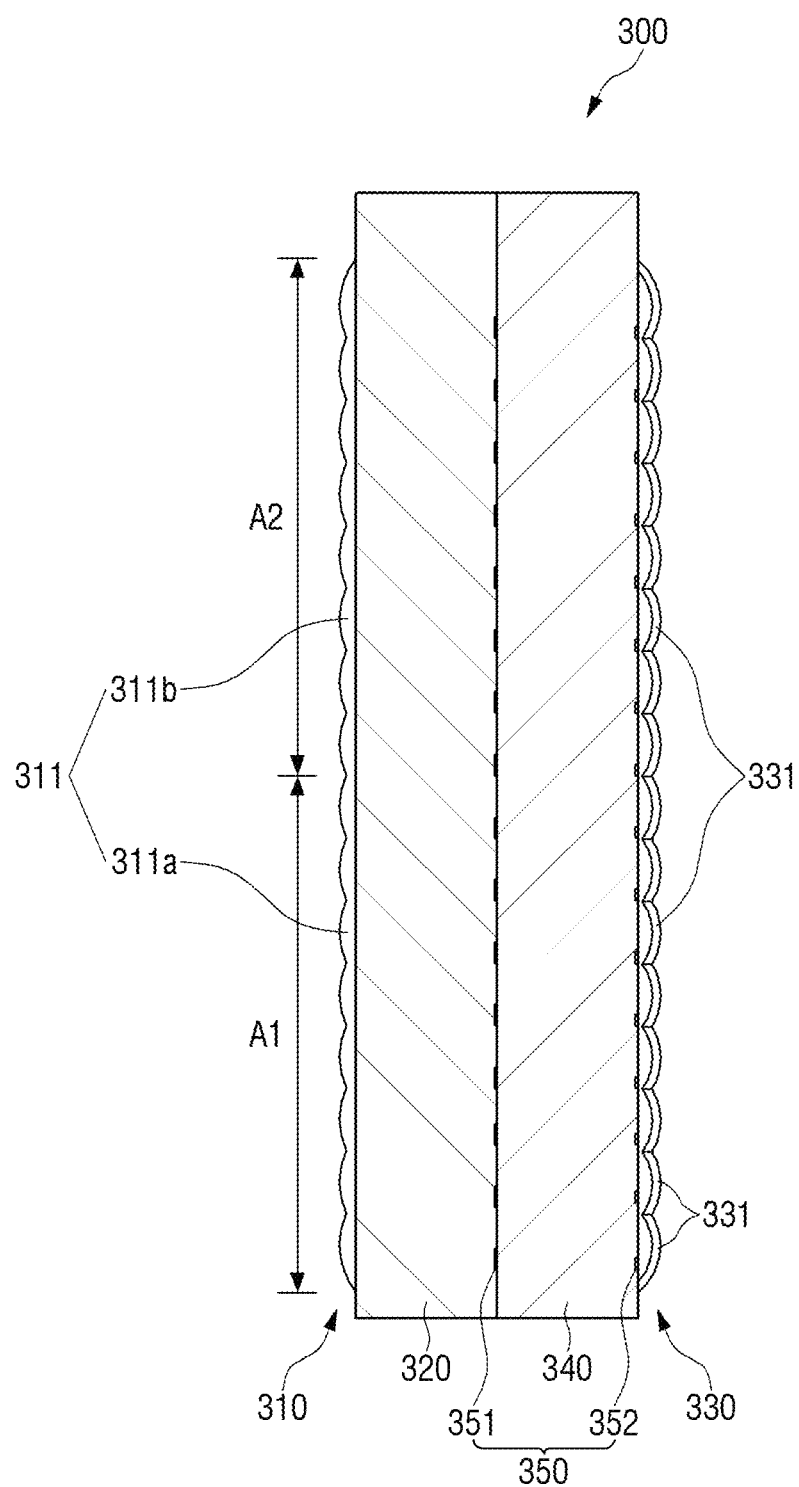
FIG. 11 is a schematic view showing a lens unit according to an exemplary embodiment of the present disclosure.
Figure 12:
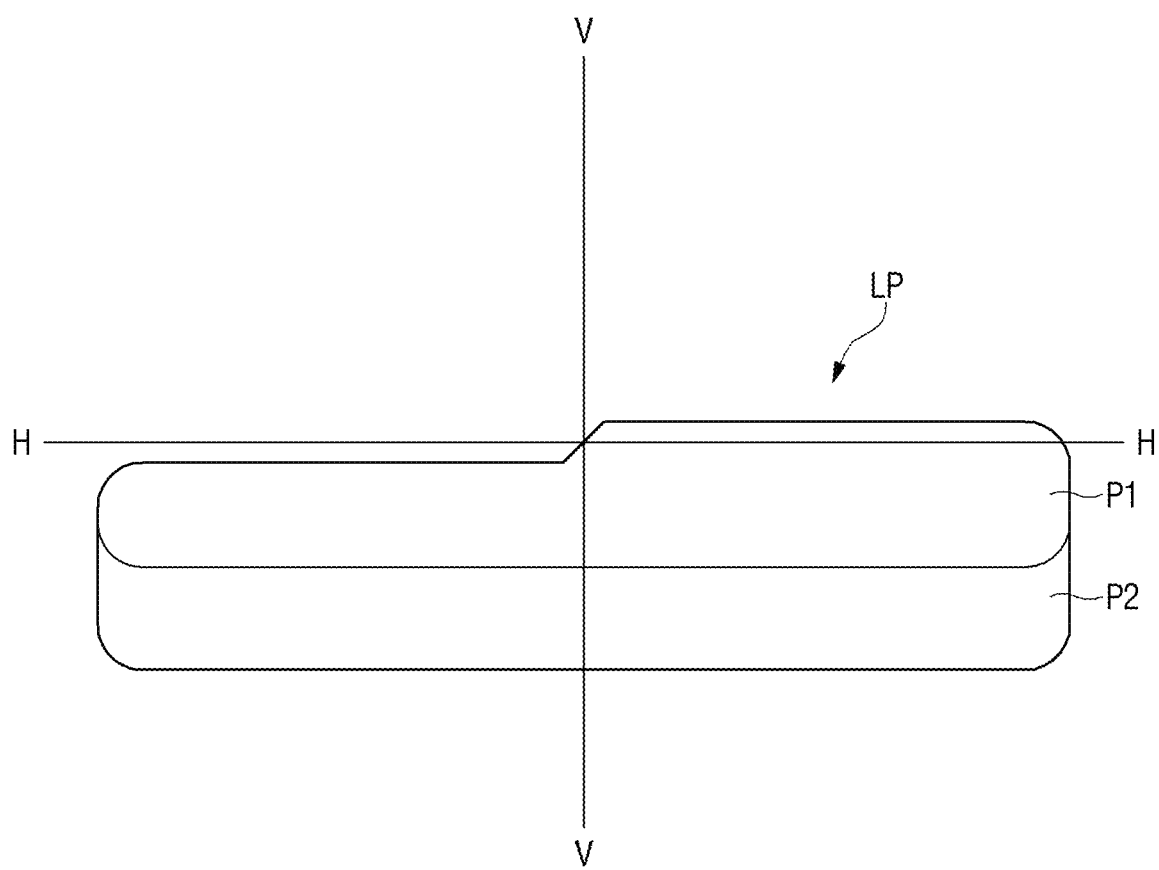
FIG. 12 is a schematic view showing a beam pattern formed by a vehicle lamp according to an exemplary embodiment of the present disclosure.

FIG. 11 is a schematic diagram illustrating a lens unit according to an exemplary embodiment of the present disclosure, and FIG. 12 is a schematic diagram illustrating a beam pattern formed by the lens unit according to an exemplary embodiment of the present disclosure. Referring to FIGS. 11 and 12, the lens unit 300 according to the exemplary embodiment of the present disclosure may be divided into a first group A1 and a second group A2 disposed above the first group A1 in the vertical direction. The first group A1 and the second group A2 may form a high illuminance region P1 and a spread region P2 in the low beam pattern of FIG. 12, respectively.

In other words, the first group A1 may include the first incident lens 311a to allow the light to be emitted in a direction parallel to the front-rear direction and form the high illuminance region P1 of the low beam pattern LP. The second group A2 may include the second incident lens 311b to allow the light to be emitted not only in a direction parallel to the front-rear direction but also in a direction inclined downward with respect to the front-rear direction, thereby forming the spread region P2 of the low beam pattern LP.

In this case, the second incident lenses 311c of the second group A2 may be configured such that the ratio of light emitted to be inclined downward with respect to the reference line C increases as it goes toward the upper end of the lens unit 300. In other words, an upper second incident lens 311c that is disposed above a lower second incident lens 311c may be configured to direct a greater amount of light downward than the lower second incident lens 311c.

In addition, in FIG. 11, a case in which the lens unit 300 is divided into two groups A1 and A2 is described as an example, but this is merely an example to help the understanding of the present disclosure. The present disclosure is not limited thereto, and the light incident to each of the plurality of incident lenses 311 may be divided into two or more groups according to an emitting direction. The size and/or position of each group may also vary.

In the above-described exemplary embodiment, an example where a portion of the light emitted from the second incident lens 311b is emitted parallel to the reference line C, and another portion is refracted downward with respect to the reference line C and emitted, so that different regions may be formed within the same beam pattern is described. However, this is merely an example to help the understanding of the present disclosure. The present disclosure is not limited thereto, and the path of the light incident to the second incident lens 311b may be variously changed according to the beam pattern to be formed by the vehicle lamp 1 of the present disclosure.

For example, different portions of light incident to the second incident lens 311b may form beam patterns for different purposes. For example, different beam patterns, such as a low beam pattern and a signal beam pattern may be simultaneously formed such that the signal beam pattern is arranged on the upper side of the low beam pattern to allow a driver to easily check a road sign or the like.

As described above, in the vehicle lamp 1 of the present disclosure, light is emitted in two or more different directions from one lamp so that the light can be irradiated to different regions within a beam pattern, or a plurality of different beam patterns can be formed at the same time. Therefore, the number of lamps required to form a beam pattern suitable for the purpose of the vehicle lamp 1 of the present disclosure may be reduced, the overall size may be reduced, and thus the cost can be reduced.

In concluding the detailed description, those skilled in the art will appreciate that many variations and modifications can be made to the exemplary embodiments without substantially departing from the principles of the present disclosure. Therefore, the disclosed exemplary embodiments of the disclosure are used in a generic and descriptive sense only and not for purposes of limitation.

What is claimed is:

1. A lamp for a vehicle comprising:
   a light source unit for generating light; and
   a lens unit for forming a predetermined beam pattern by allowing the light incident through a plurality of incident lenses from the light source unit to be emitted through a plurality of emitting lenses corresponding to each of the plurality of incident lenses,
   wherein the plurality of incident lenses comprises,
      at least one first incident lens for allowing the light incident from the light source unit to be emitted in a first direction; and
      at least one second incident lens for allowing a first portion of the light incident from the light source unit to be emitted in the first direction, and a second portion of the light to be emitted in a second direction different from the first direction,
   wherein a focal point of the at least one second incident lens and a rear focal point of a corresponding emitting lens among the plurality of emitting lenses are disposed on different vertical planes that are parallel with arrangement planes of the lens unit, and
   wherein the second incident lens is formed so that both sides thereof are asymmetrical in at least one direction with respect to a reference line that passes in a front-rear direction through a center of the second incident lens and the rear focal point of the corresponding emitting lens.

2. The vehicle lamp of claim 1, wherein the first incident lens is formed so that both sides thereof are symmetrical with respect to a reference line passing in the front-rear direction through a rear focal point of a first emitting lens corresponding to the first incident lens, among the plurality of emitting lenses.

3. The vehicle lamp of claim 1, wherein, in the second incident lens, at least one of a size, a thickness, and a curvature of the both sides is different in at least one direction with respect to the reference line.

4. The vehicle lamp of claim 1, wherein the first incident lens and the second incident lens form different regions within the same beam pattern.

5. The vehicle lamp of claim 1, wherein the first incident lens and the second incident lens form different beam patterns.

6. The vehicle lamp of claim 1, wherein the light incident to the first incident lens is emitted in a direction parallel to the front-rear direction, and
   wherein the first portion of the light incident to the second incident lens is emitted in a direction parallel to the front-rear direction, and the second portion of the light is refracted to be inclined downward with respect to the front-rear direction and emitted.

7. The vehicle lamp of claim 1, wherein the second incident lens is arranged above the first incident lens.

8. The vehicle lamp of claim 1, wherein a plurality of second incident lenses are provided, and
wherein a ratio of the second portion of the light relative to the first portion of the light associated with each of the second incident lenses changes based on a position of respective second incident lens disposed within the lens unit.

9. The vehicle lamp of claim 8, wherein the ratio for a second incident lens disposed above another second incident lens is greater than the ratio for the another second incident lens.

10. A lamp for a vehicle comprising:
a light source unit for generating light; and
a lens unit for forming a predetermined beam pattern by allowing the light incident through a plurality of incident lenses from the light source unit to be emitted through a plurality of emitting lenses corresponding to each of the plurality of incident lenses,
wherein the lens unit is divided into a plurality of groups to form different regions within the beam pattern,
wherein the plurality of groups comprise:
a first group for allowing the light to be emitted in a first direction; and
a second group for allowing a first portion of the light to be emitted in the first direction, and a second portion of the light to be emitted in a second direction different from the first direction,
wherein a focal point of an incident lens belonging to the second group and a rear focal point of a corresponding emitting lens are disposed on different vertical planes that are parallel with arrangement planes of the lens unit, and
wherein the incident lens belonging to the second group is formed so that both sides thereof are asymmetrical in at least one direction with respect to a reference line that passes in a front-rear direction through a center of the incident lens and the rear focal point of the corresponding emitting lens.

11. The vehicle lamp of claim 10, wherein a direction, in which the light is emitted from the plurality of groups, is configured based on a lens characteristic of an incident lens included in each of the plurality of groups among the plurality of incident lenses.

12. The vehicle lamp of claim 10, wherein an incident lens included in the first group among the plurality of incident lenses is formed so that both sides of the incident lens are symmetrical with respect to a reference line parallel to the front-rear direction.

* * * * *